(12) United States Patent
Borries

(10) Patent No.: US 6,578,517 B2
(45) Date of Patent: Jun. 17, 2003

(54) GAME ANIMAL FEEDER

(76) Inventor: Samuel Douglas Borries, 14812 Glendale Rd., Ocean Springs, MS (US) 39564

( * ) Notice: Subject to any disclaimer, the term of this patent is extended or adjusted under 35 U.S.C. 154(b) by 0 days.

(21) Appl. No.: 09/783,164

(22) Filed: Feb. 15, 2001

(65) Prior Publication Data

US 2002/0108579 A1 Aug. 15, 2002

(51) Int. Cl.[7] .................................................. A01K 1/10
(52) U.S. Cl. ........................ 119/53.5; 119/54; 119/52.1; 119/57.91
(58) Field of Search .............................. 119/52.1, 51.5, 119/57.91, 57.1, 51.04, 53, 725, 51.01, 53.5, 54; D30/121, 124

(56) References Cited

U.S. PATENT DOCUMENTS

| | | | | |
|---|---|---|---|---|
| 2,972,334 A | * | 2/1961 | Braden | 119/51.01 |
| 5,109,798 A | * | 5/1992 | Impastato et al. | 119/51.03 |
| 5,301,634 A | * | 4/1994 | Ho | 119/477 |
| 5,333,572 A | * | 8/1994 | Nutt | 119/57.91 |
| D350,419 S | * | 9/1994 | Long | D30/124 |
| D392,428 S | * | 3/1998 | Atchley | D30/121 |
| 5,816,194 A | * | 10/1998 | Huff | 119/72.5 |

* cited by examiner

Primary Examiner—Peter M. Poon
Assistant Examiner—Bethany Griles
(74) Attorney, Agent, or Firm—Keil & Weinkauf

(57) ABSTRACT

An autonomus, weatherproof device is capable of providing dry feed material to game animals. This device provides minimal feed "on demand" as the target animal makes contact with the device actuator. Vents in the device alert animals to the presence of the food by releasing continuous scent. A key feature of the device is an internal baffle that mitigates the gravity-fed pressure of a large feed column upon the actuator. The device can be sized to contain any suitable feed material and physically located to encourage or discourage nontarget animals from foraging. While the present invention is designed for hunters to attract game animals, domestic animals could also be fed using such a device.

6 Claims, 3 Drawing Sheets

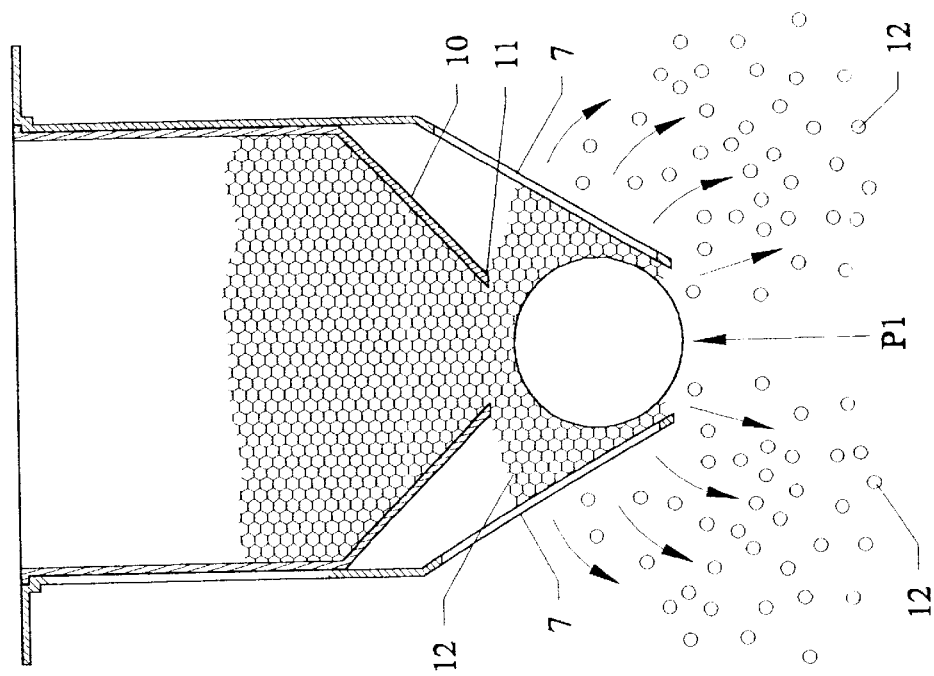
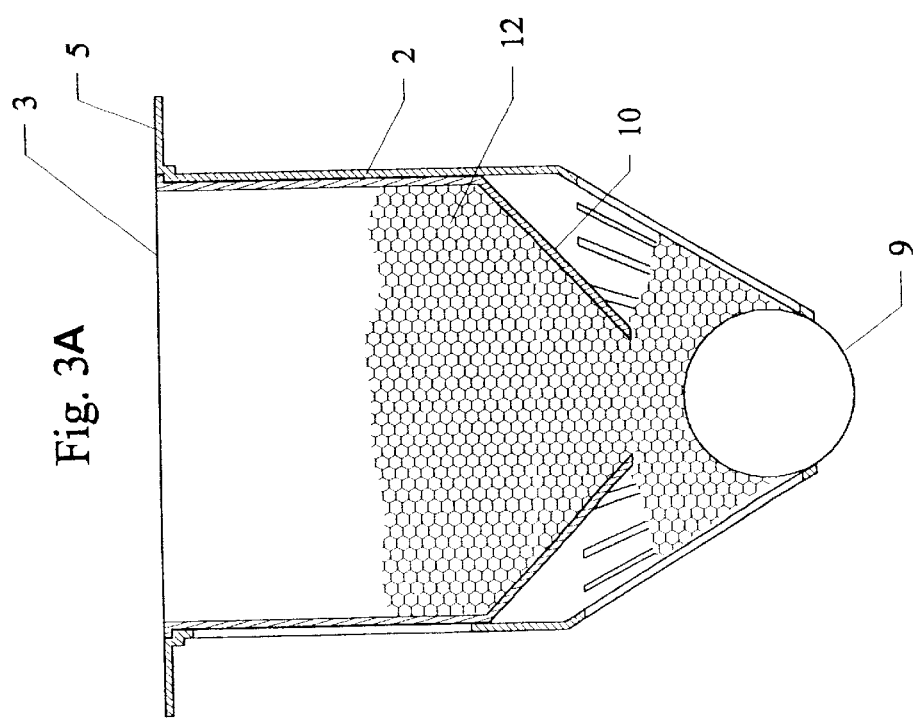

GAME ANIMAL FEEDER

BACKGROUND OF THE INVENTION

1. Field of the Invention

The present invention relates to devices that dispense granular dry foods to wild or domestic animals without active oversight by a human. Minimal food is wasted due to active interaction of the feeding animal with the feeder device.

2. Description of the Prior Art

While ancient man depended upon successful hunting to survive, contemporary hunters recognize that only a portion of their time can be allocated to hunting. To be successful, the contemporary hunter must rely upon luck, skill, and any means at his disposal to increase the odds of coming upon animals and thereby gaining the opportunity for a successful hunt.

Hunters often seek to increase their odds of success by luring prey to a-convenient location with food. One known, ancient method involves simply spreading food repeatedly over an area until the target animals become accustomed to the presence of food. Once accustomed, such animals will tend to congregate in the dispersal area, making them predictable targets. This crude method has several disadvantages. First, this method is entirely nonspecific. For example, corn that is dispersed to attract deer will also be eaten by small birds and rodents. Second, due to heavy, nonspecific feeding, such a method requires repeated intrusion by a human in order to replenish the available food. Some animals, particularly large animals like deer, will not approach a food source if the scent of humans is too strong. Animals will also lose interest if the food is not consistently available. Third, a hunter must spend a great deal of his precious time moving from location to location spreading feed instead of more satisfying pursuits.

Another popular way for hunters to lure target animals is to employ some sort of feeding device. The most common of these devices is a bird feeder, although similar devices can be envisioned for other animals. Typically, a hopper or column contains the dry feedstock which is fed by gravity through one or more outlets at the base of the device. As an animal feeds at an outlet, additional feedstock falls due to gravity. While this device is somewhat more specific, a device for feeding birds could be elevated to eliminate rodent foraging for example, it is still wasteful. During the gravity feed process, considerable material may fall to the ground thereby again becoming a nonspecific source of food for other animals. Further, such devices only work particularly well for birds that feed on small, easily flowing dry food such as seeds. Larger, coarser feed, such as corn, can easily block the outlet, or the static friction between the feed can resist movement due solely to gravity and thereby render such a device unusable without human intervention or some sort of powered, mechanical agitation. While such devices can be made quite tall in order to hold a large amount of feed material, a large column of such material exerts a considerable force at the opening which can lead to undesirable spillage and/or blockage.

SUMMARY OF THE INVENTION

The present invention is an autonomous, weatherproof device capable of providing dry feed material to game animals. The device provides minimal feed "on demand" as the target animal makes contact with the device actuator. Vents in the device alert animals to the presence of the food by releasing continuous scent. The device works without the aid of batteries, motors, or electricity and can function unattended for long periods of time. It can be sized to contain any suitable feed material and physically located to encourage or discourage nontarget animals from foraging. While the present invention is designed for hunters to attract game animals, domestic animals could also be fed using such a device.

A key feature of the present invention is a conical internal baffle that mitigates the gravity fed pressure of a large feed column upon the actuator.

BRIEF DESCRIPTION OF THE DRAWINGS

FIG. 3A is a cut away view of the present invention during inactivity.

FIG. 3B is a cut away view of the present invention during actuation.

DESCRIPTION OF THE PREFERRED EMBODIMENTS

Figure 1:
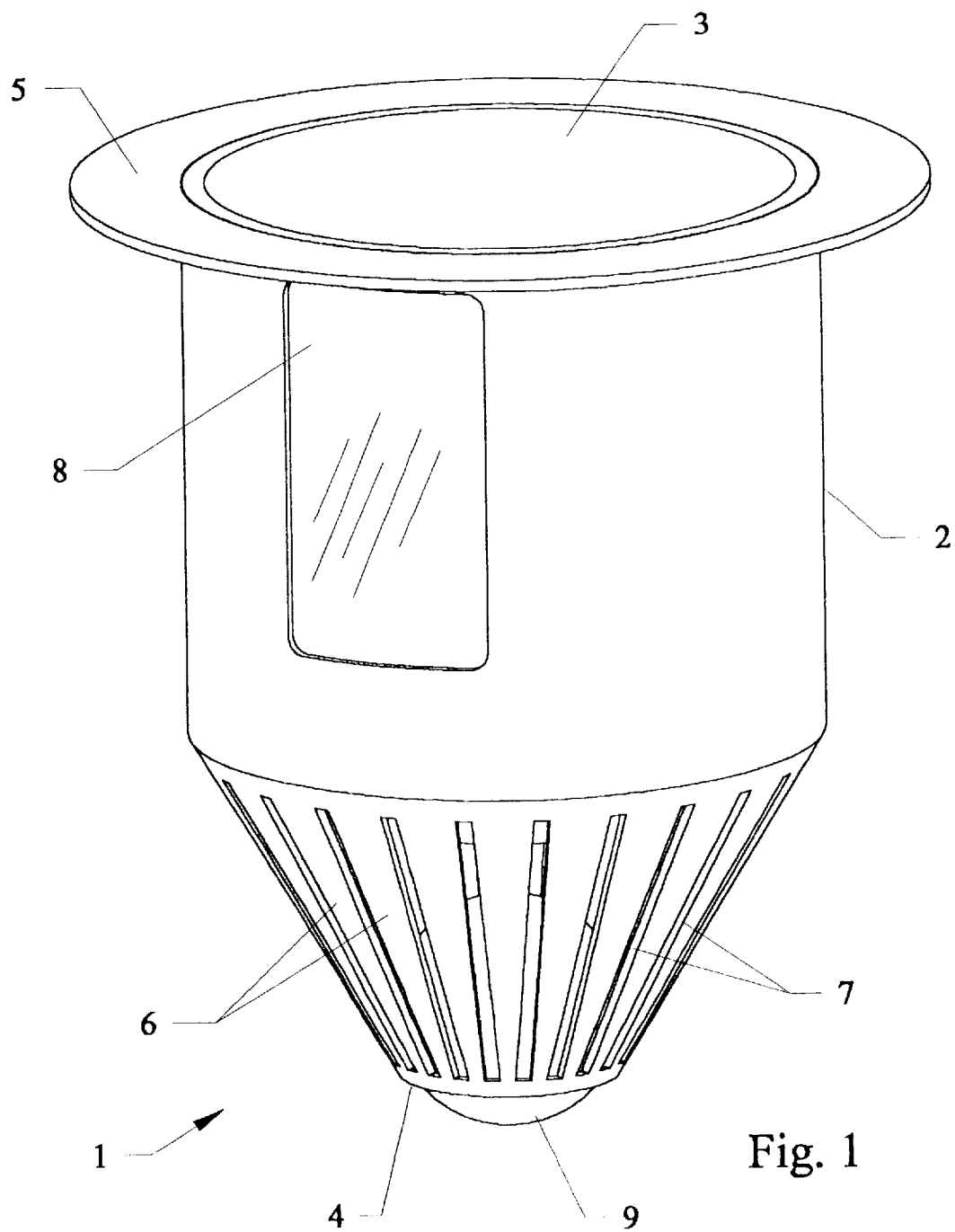
FIG. 1 is an oblique view of the present invention.
Figure 2:
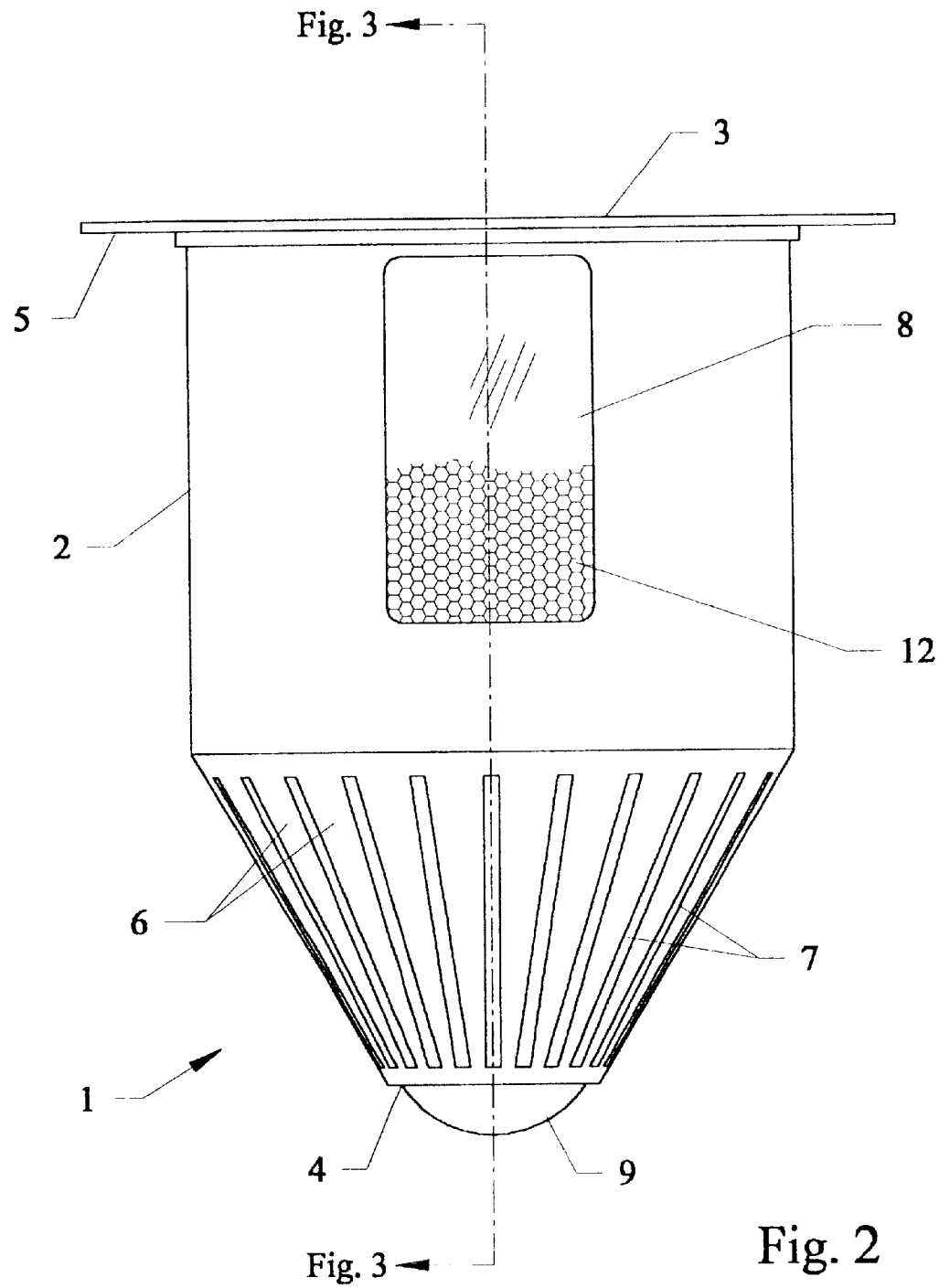
FIG. 2 is a side view of the present invention.

FIGS. 1 and 2 are directed to a view of the present invention. Feeder device 1 includes a hollow, cylindrical hopper 2 with an open first end 3 and an open, somewhat smaller diameter second end 4. The horizontal cross-section of hopper 2 is round in the preferred embodiment, but this geometry is not limiting. Hopper 2 and first end could have a square horizontal cross section. However, in order for the invention to function properly, second end 4 must be round in horizontal cross-section.

An annular flange 5 surrounds and is integral with said first end 3, which is generally considered to be the top, or uppermost surface, of the device. Annular flange 5 facilitates the attachment of the feeder device 1 to the bottom of a large container of dry food (not pictured). Annular flange 5 may be attached to said food container using any means known for mechanical fastening such as clips or screws. Alternatively, annular flange 5 may have several holes drilled through it. Said holes could mechanically fasten to guide pins located on the bottom surface of said food container.

Second end 4 is considered to be the bottom of the device. An integral tapering outer cone 6 of reducing diameter gradually narrows the cylinder. The slope of outer cone 6 is not critically important nor meant to be limiting. However, in the preferred embodiment a slope of between 30 and 70 degrees has proven effective.

The sloping sides of outer cone 6 include vents 7 perforating the wall of outer cone 6. These vents 7 are designed in such a way that the target animal can smell the dry feed contained within, but the vents 7 are small enough that feed does not readily fall through the walls of the device to the ground. In the preferred embodiment, said vents 7 comprise periodic slits down the length of outer cone 6. A plurality of slits is employed to maximize scent distribution around the entire feeder device 1. The number and size of slits is only constrained by the strength of wall material from which outer cone 6 is manufactured. Sufficient wall material must remain to retain the shape of the device. In an alternate embodiment, said vents 7 could comprise round holes drilled in the solid sides of outer cone 6.

As mentioned previously, second end 4 is open and circular in horizontal cross-section. An actuator 9 blocks the circular opening in second end 4. In the preferred embodiment, actuator 9 consists of a spherical ball of slightly larger diameter than the circular opening in second end 4. Actuator 9 is located inside of outer cone 6 so that gravity forces said actuator down to block the circular opening in second end 4 as shown in FIG. 3A. In operation, a target animal, lured by the scent of dry food 12, quickly learns to press upward on actuator 9, against gravity, thereby displacing the free floating spherical ball to position P1 and releasing some amount of dry food through second end 4 as shown in FIG. 3B. Slits 7 may be made wider at the top of outer cone 6 so that minimal dry food is forced up and out of outer cone 6 by the upward movement of actuator 9. When the target animal releases actuator 9 to feed on the released food, actuator 9 again seals the opening of second end 4. The spherical geometry of actuator 9 ensures that a resealing of the circular opening at second end 4 always occurs.

A critical element of the present invention is an internal baffle 10 as shown in FIGS. 3A and 3B. Baffle 10 comprises a truncated inner cone attached to or integral with the inner surface of hopper 2. The inner cone of baffle 10 slopes down toward the bottom of the device and terminates in a baffle opening 11. The diameter of baffle opening 11 is much smaller than the diameter of hopper 2; however, baffle opening 11 must be larger than the average diameter of the dry food so that food can flow through it. The bottom most part of baffle 10 is located far enough "up" inside hopper 2 so that the spherical ball of actuator 9 moves freely up and down without jamming against baffle 10. In the preferred embodiment, the vertical distance measured between the circular opening in second end 4 and the baffle opening 11 is approximately 1.5 times the diameter of the spherical ball of actuator 9. The slope of baffle 10 is not meant to be limiting. However, in the preferred embodiment a slope of between 30 and 60 degrees has proven effective.

The primary function of baffle 10 is to support the weight of a large column of dry food 11 in hopper 2 and in a large container of dry food (not pictured) beneath which the invention is attached in alignment with a feed hole in the base of the large container. Without baffle 10, such a large weight of food exerts great downward force upon the spherical ball of actuator 9, so much force that an animal would not be able to properly actuate the device and would not be able to feed.

Baffle 10 provides a simple metering function so that a feeding animal need only press actuator 9 upwards against the weight of the relatively small mass of food trapped beneath baffle 10 inside of hopper 2. As the space beneath baffle 10 empties through the opening of second end 4, additional feedstock flows down through baffle opening 11 to replenish the vacated space.

In operation, specific animals can be targeted by the selection of an appropriate feed material and by locating the feeder device 1 and large container of food (not-pictured) in such a manner to discourage feeding by non-targeted animals. To attract deer, for example, the actuator of the present invention should be located between four and five feet above the ground so squirrels and raccoons can not use the device. Because large amounts of food can be stored and distributed specifically using the present invention, infrequent maintenance or resupply would be required.

All elements of the feeder device 1 are envisioned to be weatherproof. Without limitation, said elements could be manufactured from any combination of plastic, aluminum, steel, composites, and or rubber. In the preferred embodiment, all elements of feeder device 1 are manufactured from plastic by any means known in the art. If such plastic was opaque, an optional optically clear window 8 could be incorporated into the side of hopper 2 to visually indicate whether or not the device was working properly.

While the present invention is designed for hunters to attract game animals, domestic animals could also be fed using such a device.

What is claimed is:

1. A game animal feeder comprising:

a hollow cylindrical hopper having a first and second end, an annular flange, a truncated outer cone, an actuator, and a baffle;

wherein said annular flange surrounds and is integral with said first end;

wherein said truncated outer cone reduces the diameter of said hopper terminating in a circular opening at said second end;

wherein said truncated outer cone includes at least one vent perforating the wall of said outer cone;

wherein said actuator consists of a spherical ball of larger diameter than the circular opening at said second end;

wherein said actuator is located inside said hopper at said second end;

wherein said actuator can move freely within said hopper;

wherein said baffle consists of a second truncated cone attached to or integral with the inner surface of said hopper, said baffle slopes toward said second end of the device and terminates in a baffle opening.

2. The game animal feeder of claim 1, wherein the vertical distance measured between said second end and said baffle opening is at least 1.5 times the diameter of the spherical ball of said actuator.

3. The game animal feeder of claim 2, wherein said vents comprise periodic slits down the length of said outer cone.

4. The game animal feeder of claim 2, wherein said vents comprise round holes.

5. The game animal feeder of claim 3, further comprising an optically clear window incorporated into the side of said hopper.

6. The game animal feeder of claim 4, further comprising an optically clear window incorporated into the side of said hopper.

* * * * *